United States Patent [19]

Ichihara

[11] Patent Number: 4,649,444
[45] Date of Patent: Mar. 10, 1987

[54] DISK SUPPORT DEVICE HAVING DEFORMATION LIMITING MEMBER
[75] Inventor: Akira Ichihara, Kakuda, Japan
[73] Assignee: Alps Electric Co., Ltd., Japan
[21] Appl. No.: 692,289
[22] Filed: Jan. 16, 1985
[30] Foreign Application Priority Data Jan. 17, 1984 [JP] Japan ................................ 59-4476[U]

[51] Int. Cl.⁴ .............................................. G11B 5/016
[52] U.S. Cl. ..................................... 360/99; 206/444; 369/261
[58] Field of Search ....................... 360/86, 97, 98, 99, 360/133; 206/444; 369/261, 262, 270

[56] References Cited

U.S. PATENT DOCUMENTS 4,499,573  2/1985  Morinaga .......................... 360/133 X
4,517,617  5/1985  Tsuji et al. .......................... 360/99 X

FOREIGN PATENT DOCUMENTS 3303433  8/1983  Fed. Rep. of Germany ... 360/97 X
2081959  2/1982  United Kingdom ................ 369/270

Primary Examiner—Robert S. Tupper
Assistant Examiner—Andrew L. Sniezek
Attorney, Agent, or Firm—Guy W. Shoup

[57] ABSTRACT

A disk support device for supporting a disk having a central hub, a central support hole and a rotatable drive shaft, a turntable fixedly mounted on the rotatable drive shaft and having a hole for supporting the disk on one surface thereof with the rotatable drive shaft inserted in the central support hole in the disk, a leaf spring having one end fixed to an opposite surface of the turntable and supporting a positioning pin remotely from the one end thereof, the positioning pin projecting under the resiliency of the leaf spring through the hole in the turntable for engagement in the support hole in the disk, and a stopper fixed to the opposite surface of the turntable in spaced relation thereto, the leaf spring being interposed between the opposite surface of the turntable and the stopper for being subjected to a limited extent of deformation.

3 Claims, 8 Drawing Figures

DISK SUPPORT DEVICE HAVING DEFORMATION LIMITING MEMBER

BACKGROUND OF THE INVENTION

The present invention relates to a disk support device for supporting and driving a small-size disk such as a 3.5-inch magnetic disk, and more particularly to a disk support device capable of accurately positioning a disk at the time it is supported thereon.

One conventional type of disk support device is illustrated in FIGS. 1 and 2 of the accompanying drawings. The disk support device serves to drive a flexible magnetic disk which is 3.5 inches across.

The disk support device includes a rotatable drive shaft 1 which is rotated by a brushless motor (not shown) rotating at a constant speed, and a turntable 2 fixed to an upper end portion of the rotatable drive shaft 1. The rotatable drive shaft 1 has an upper end 1a projecting beyond an upper surface of the turntable 2. The turntable 2 has a hole 2a and an internally threaded hole 2b. A leaf spring 3 is mounted on a lower surface of the turntable 2 and has a central recess 3a defined therein and a support hole 3b defined in an end thereof. The leaf spring 3 has a positioning pin 4 fixed to an opposite end thereof. The rotatable drive shaft 1 is inserted in the recess 3a in the leaf spring 3. A fastening screw 5 is inserted through the support hole 3b threadedly into the internally threaded hole 2b to secure the corresponding end of the leaf spring 3 to the lower surface of the turntable 2. The positioning pin 4 projects upwardly out of the hole 2a beyond the upper surface of the turntable 2.

FIGS. 3 and 4 illustrate the manner in which a flexible magnetic disk 6 is mounted on the disk support device shown in FIGS. 1 and 2. Designated at 7 is a hub secured to a central portion of the magnetic disk 6. As shown in FIG. 3, the hub 7 has a central support hole 7a and another support hole 7b. When the magnetic disk 6 is mounted on the disk support device, the end 1a of the rotatable drive shaft 1 is inserted in the central support hole 7a and the positioning pin 4 is inserted in the other support hole 7b.

In operation, the turntable 7 is rotated clockwise in the direction of the arrow A by the rotatable drive shaft 1 to thereby rotate the hub 7 and the magnetic disk 6 in the direction of the arrow A. A magnetic head (not shown) is pressed against the magnetic disk 6 to record or reproduce information.

While the magnetic head is pressed against the magnetic disk 6, a resistance is imposed from the magnetic disk 6 on the magnetic head to bring an edge of the support hole 7b in the hub 7 into abutment against the positioning pin 4, which is then subjected to a force in the direction of the arrow B. Therefore, the positioning pin 4 tends to be tilted through an angle α, thus deforming the leaf spring 3 as shown in FIG. 4.

When this happens, the hub 7 is displaced off the properly mounted position on the turntable 2. In general, one-pulse index signals are recorded at given positions on the magnetic disk in magnetic disk recording apparatus. The positions where such index signals are recorded must be accurate in order to ensure compatibility among the magnetic disk recording apparatus. If the magnetic disk 6 is displaced off position with respect to the turntable 2 as described above, then index signals will be generated at different positions, and compatibility among the magnetic disk recording apparatus will be lost.

SUMMARY OF THE INVENTION

With the prior art shortcoming in view, it is an object of the present invention to provide a disk support device of a simple construction which is capable of positioning a magnetic disk accurately with respect to a turntable.

According to the present invention, there is provided a disk support device for supporting a disk having a central hub having a central support hole and a support hole includes a rotatable drive shaft, a turntable fixedly mounted on the rotatable drive shaft and having a hole for supporting the disk on one surface thereof with the rotatable drive shaft inserted in the central support hole in the disk, a leaf spring having one end fixed to an opposite surface of the turntable and supporting a positioning pin remotely from the one end thereof, and a stopper fixed to the opposite surface of the turntable in spaced relation thereto, the leaf spring being interposed between the opposite surface of the turntable and the stopper for being subjected to a limited extent of deformation. When the turntable is rotated, the deformation of the leaf spring is limited to prevent the positioning pin from being unduly tilted with respect to the turntable.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 5:
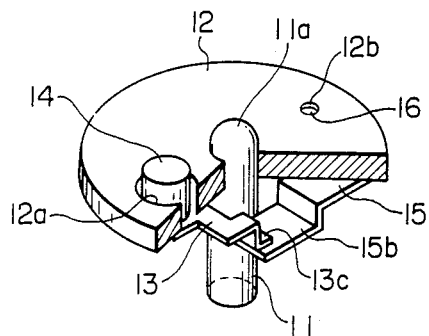
FIG. 5 is a perspective view, partly broken away, of a disk support device according to the present invention.
Figure 6:
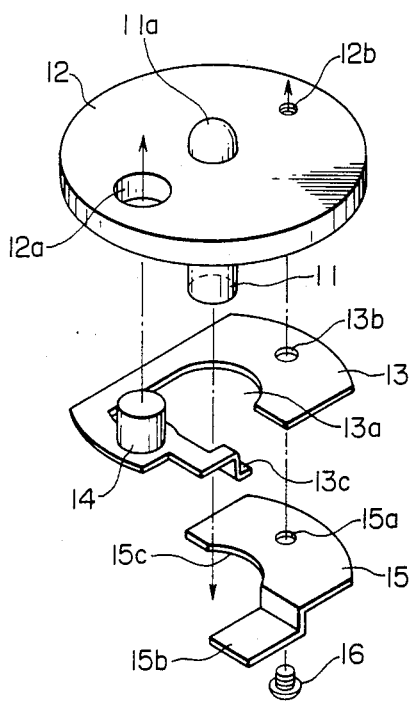
FIG. 6 is an exploded perspective view of the disk support device shown in FIG. 5.

FIGS. 5 and 6 illustrate a disk support device according to the present invention.

The disk support device of the present invention includes a rotatable drive shaft 11 which is rotated by a brushless motor (not shown) which is driven to rotate at a constant speed, and a turntable 12 fixed to an upper end portion of the rotatable drive shaft 11. The rotatable drive shaft 11 has an upper end 11a projecting beyond an upper surface of the turntable 12. The turntable 12 has a hole 12a and an internally threaded hole 12b, and also has a recess 12c defined in an outer peripheral surface thereof. A leaf spring 13 is mounted on a lower surface of the turntable 12 and has a central recess 13a defined therein and a support hole 13b defined in an end thereof. The leaf spring 13 has a crank-shaped finger 13c extending in an opening of the recess 13a, and a positioning pin 14 fixed as by staking to an opposite end of the leaf spring 13. An auxiliary plate 15 is disposed below the leaf spring 13 and is composed of a thick metal sheet which will not be easily deformed under external forces applied thereto. The auxiliary plate 15 has a support hole 15a in one end thereof and a stopper 15b bent from an opposite end thereof, there being a recess 15c defined in an edge adjacent to the stopper 15b.

When the leaf spring 13 the auxiliary plate 15 are mounted on the lower surface of the turntable 12, the rotatable drive shaft 11 is inserted in the recess 13a in the leaf spring 13 and positioned in the recess 15c in the auxiliary plate 15. A fastening screw 15 is inserted through the support holes 15a, 13b threadedly into the internally threaded hole 12b to secure the leaf spring 13 and the auxiliary plate 15 to the lower surface of the turntable 12. The positioning pin 14 projects upwardly out of the hole 12a beyond the upper surface of the turntable 12. The stopper 15b of the auxiliary plate 15 is spaced from the lower surface of the turntable 12, with the finger 13c interposed between the lower surface of the turntable 12 and the stopper 15b.

To a flexible magnetic disk 6 to be mounted on the disk support device, there is centrally fixed a hub 7 (FIG. 7) having a central support hole 7a and another support hole 7b defined therein.

Figure 7:
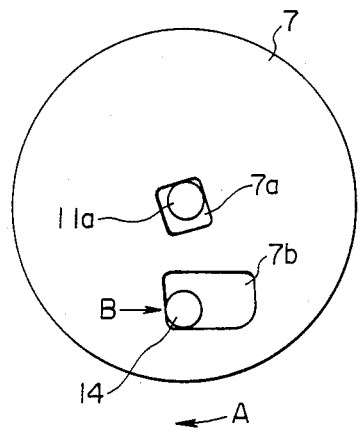
FIG. 7 is a plan view of the disk support device of FIG. 5 with a magnetic disk mounted thereon.
Figure 8:
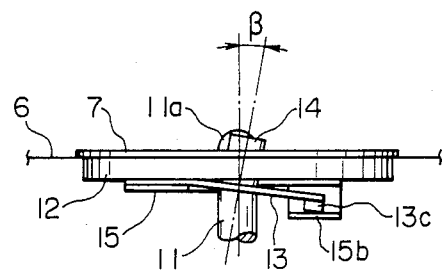
FIG. 8 is a front elevational view of the disk support device as illustrated in FIG. 7.

Operation of the disk support device thus constructed is as follows:

When the magnetic disk 6 is to be mounted on the disk support, the hub 7 is placed on the upper surface of the turntable 12 (FIGS. 7 and 8). At this time, the distal end 11a of the rotatable drive shaft 11 projecting from the turntable 12 is inserted in the central support hole 7a. The positioning pin 14 is held against the lower surface of the hub 7 and has its distal end disposed back in the turntable 12 with the leaf spring 13 being flexed. As the turntable 12 starts rotating and the positioning pin 14 reaches the support hole 7b in the hub 7, the positioning pin 14 is inserted into the support hole 7b and projects upwardly beyond the upper surface of the hub 7 under the resilient force of the leaf spring 13. Thereafter, the positioning pin 14 drives the hub 7 to rotate the magnetic disk 6 in the direction of the arrow A in FIG. 7.

Figure 1:
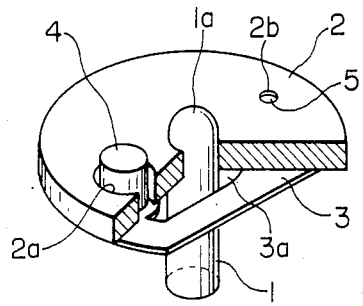
FIG. 1 is a perspective view, partly cut away, of a prior disk support device.
Figure 3:
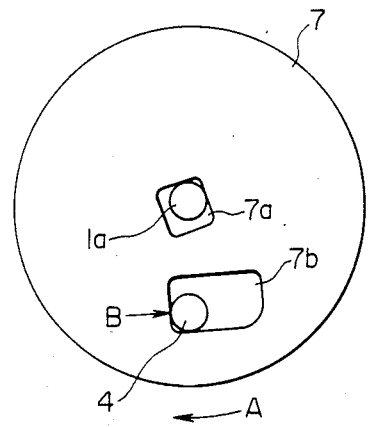
FIG. 3 is a plan view of the disk support device of FIG. 1 with a magnetic disk mounted thereon.
Figure 2:
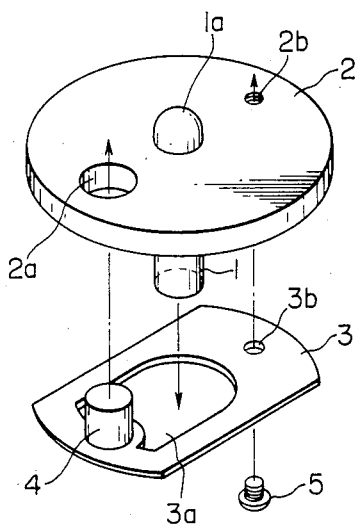
FIG. 2 is an exploded perspective view of the disk support device shown in FIG. 1.
Figure 4:
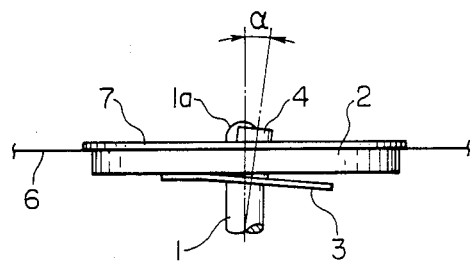
FIG. 4 is a front elevational view of the disk support device as shown in FIG. 3.

Since a magnetic head is pressed against the magnetic disk 6 during operation of the magnetic recording and reproducing apparatus, as described above, the magnetic disk 6 is subjected to a resistance to rotation thereof, and hence the hub 7 imposes a force in the direction of the arrow B in FIG. 7 on the positioning pin 14. Therefore, the leaf spring 13 tends to be twisted, but is twisted only to a limited extent since the finger 13c of the leaf spring 13 is engaged by the stopper 15b of the auxiliary plate 15. As a consequence, the positioning pin 14 is tilted by the force applied in the direction B through an angle $\beta$ which is much smaller than the angle $\alpha$ shown in FIG. 4. The angle $\beta$ is determined solely by the dimensions of the finger 13c and the stopper 15b. Therefore, by keeping the angle $\beta$ in a range corresponding to an allowable error of the positional accuracy of the index signals recorded on the magnetic disk 6, the positions where the index signals are generated are rendered accurate. Desired compatibility amonth the recording and reproducing apparatus is thus ensured.

Although in the illustrated embodiment the leaf spring 13 has the finger 13c which is interposed between the lower surface of the turntable 12 and the stopper 15b, the stopper 15b may be of a greater area and spaced from the turntable 12 with only a small spacing therebetween, and the leaf spring 13 may be disposed as a whole between the turntable 12 and the stopper 15b for limited movement therebetween.

With the arrangement of the present invention, the positioning pin is tilted only through a minimum angle smaller than a certain critical angle when the pisitioning pin is subjected to a force tending to resist the rotation of the magnetic disk. The magnetic table is thus positioned accurately on the turntable, and hence the positions of the index signals recorded on the magnetic disk are accurately determined with respect to the turntable. The index signals are always generated at the same positions in different magnetic recording and reproducing apparatus, which are therefore rendered compatible with each other. The construction for ensuring the above positional accuracy is simple since the positioning pin is prevented from being unduly tilted by the stopper disposed below the leaf spring.

Although a certain preferred embodiment has been shown and described, it should be understood that many changes and modifications may be made therein without departing from the scope of the appended claims.

What is claimed is:

1. In a disk support device having a rotatable shaft, a turntable mounted on said rotatable shaft for supporting a disk on one surface thereof, said disk having a central hub provided with a central hole positioned on said shaft and a radially spaced second support hole, said turntable having a radially spaced hole positioned to align with said second support hole of said hub, and a positioning pin supported on one end of a leaf spring mounted on an opposite surface of said turntable and adapted to project under the resiliency of said leaf spring through said hole of said turntable into said second support hole of said hub in order to engage the disk for rotation with said turntable, the improvement wherein a stopper is mounted to said opposite surface of said turntable having a stopper portion spaced a predetermined distance from said opposite surface, and said leaf spring has an engaging portion interposed between said opposite surface and said stopper portion for limiting the extent of deformation of said projecting pin under the resiliency of said leaf spring.

2. A disk support device according to claim 1, wherein said engaging portion is a crank-shaped finger extending from said one end of said leaf spring on which said projecting pin is supported.

3. A disk support device according to claim 1, wherein said stopper includes an auxiliary plate mounted to said opposite surface of said turntable and said stopper portion extends from said auxiliary plate.

* * * * *